(12) United States Patent
Suer et al.

(10) Patent No.: US 9,311,611 B2
(45) Date of Patent: Apr. 12, 2016

(54) AUTOMATED SERVICE LEVEL MANAGEMENT SYSTEM

(75) Inventors: Myles Suer, San Diego, CA (US);
Barbara Newton, San Diego, CA (US);
David Baron, San Diego, CA (US);
Michael Lazarus, San Diego, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 2617 days.

(21) Appl. No.: 11/454,733

(22) Filed: Jun. 16, 2006

(65) Prior Publication Data
US 2007/0294406 A1    Dec. 20, 2007

(51) Int. Cl.
| G06Q 10/10 | (2012.01) |
| G06Q 10/06 | (2012.01) |
| G06Q 30/06 | (2012.01) |
| G06Q 10/08 | (2012.01) |

(52) U.S. Cl.
CPC ..................... *G06Q 10/06* (2013.01)

(58) Field of Classification Search
USPC ......................................... 705/1, 1.1
See application file for complete search history.

(56) References Cited

U.S. PATENT DOCUMENTS

| 6,070,147 | A | 5/2000 | Harms et al. |
| 6,070,148 | A | 5/2000 | Mori et al. |
| 6,070,149 | A | 5/2000 | Tavor et al. |
| 6,431,439 | B1 | 8/2002 | Suer et al. |
| 6,775,825 | B1 | 8/2004 | Grumann et al. |
| 7,725,570 | B1* | 5/2010 | Lewis ........................ 709/224 |
| 2002/0035495 | A1* | 3/2002 | Spira et al. .................... 705/7 |
| 2002/0065907 | A1 | 5/2002 | Cloonan et al. |
| 2002/0091607 | A1* | 7/2002 | Sloan et al. .................... 705/36 |
| 2002/0099669 | A1 | 7/2002 | Lauer |
| 2002/0129157 | A1 | 9/2002 | Varsano |
| 2004/0015381 | A1* | 1/2004 | Johnson et al. ................ 705/8 |
| 2005/0071182 | A1 | 3/2005 | Aikens et al. |
| 2005/0096949 | A1* | 5/2005 | Aiber et al. .................... 705/7 |
| 2005/0144033 | A1* | 6/2005 | Vreeke et al. .................. 705/1 |
| 2005/0261933 | A1 | 11/2005 | Magnuson |
| 2006/0023638 | A1 | 2/2006 | Monaco et al. |
| 2006/0087979 | A1 | 4/2006 | Schine et al. |
| 2006/0111087 | A1 | 5/2006 | Leitgeb et al. |
| 2006/0112075 | A1 | 5/2006 | Hellerstein et al. |
| 2006/0112317 | A1* | 5/2006 | Bartolini et al. ............... 714/47 |
| 2006/0117059 | A1 | 6/2006 | Freeman, Jr. et al. |
| 2006/0123022 | A1 | 6/2006 | Bird |
| 2006/0123477 | A1 | 6/2006 | Raghavan et al. |

* cited by examiner

*Primary Examiner* — Jonathan Ouellette
(74) *Attorney, Agent, or Firm* — Hewlett Packard Enterprise Patent Department

(57) ABSTRACT

A method for service level management comprises identifying connected enterprise application components and, under control of an automated system, relating historical performance for the connected enterprise application components and electronically creating a service level agreement based on the historical performance relation.

25 Claims, 16 Drawing Sheets

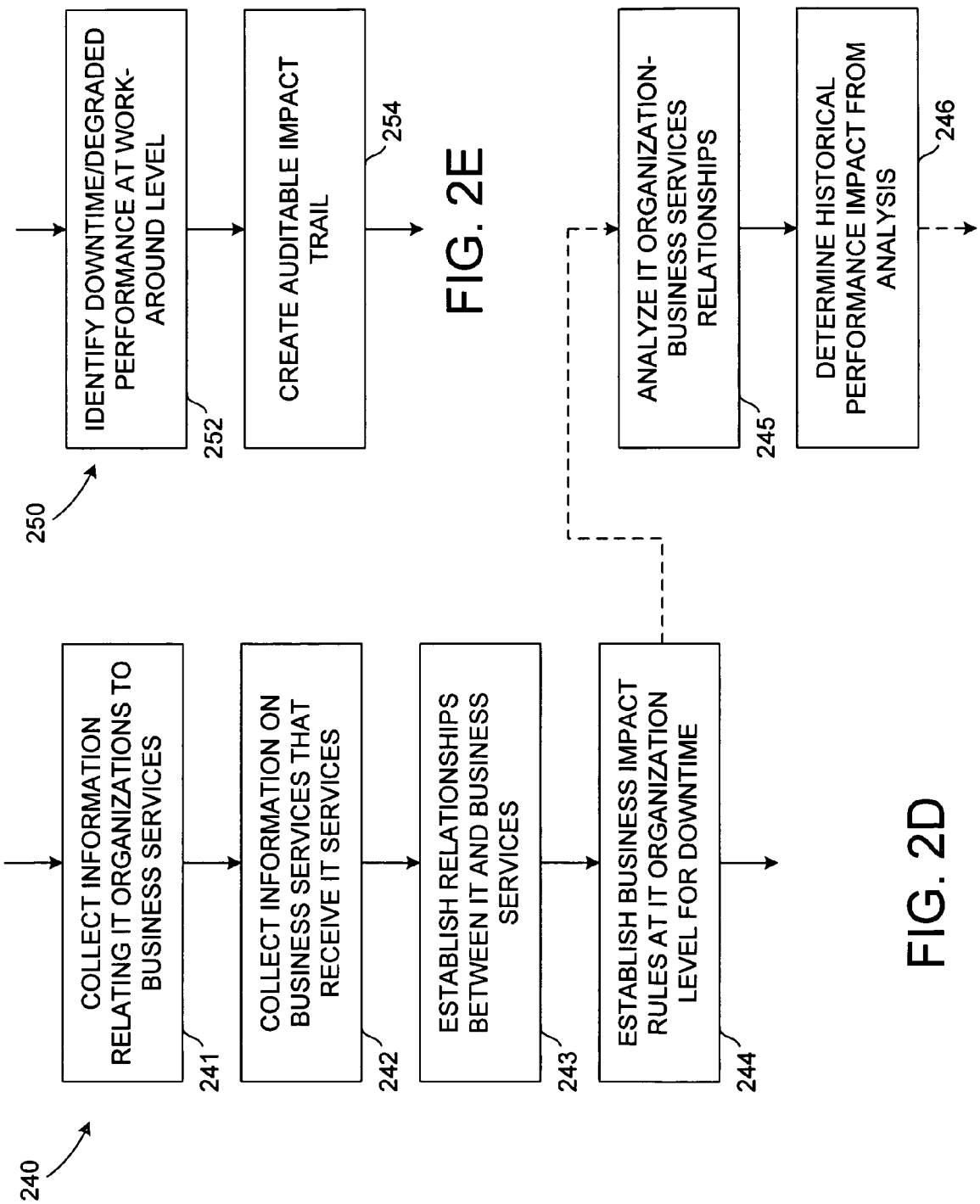

700

VALUE CENTER

NAME: WEST COAST SALES
PARENT: WORLDWIDE SALES
OWNER CONTACT: BILL JONES
TYPE: DEPARTMENT

BUSINESS APPLICATIONS:   ⊙ NEW   + LINK   X REMOVE

| | NAME | TYPE | PRIORITY | VALUE IMPACT |
|---|---|---|---|---|
| ☐ | COMPANY 1 | SALES | 1 | ⊙ DEFINE |
| ☐ | COMPANY 2 | CUSTOMER PG | 1 | ⊙ VIEW |
| | | TELECOM | 2 | |

VALUE IMPACT RULES

APPLICATION:   APP1
CUSTOMER:   WEST COAST SALES

VALUE IMPACT RULES:   ⊙ NEW   + LINK   X REMOVE

| | NAME | TYPE |
|---|---|---|
| ☐ | WORKWEEK OUTAGE IMPACT | FIXED RATE |
| ☐ | END OF MONTH OUTAGE IMPACT | STEPPED RATE |
| ☐ | DATA CORRUPTION IMPACT | FIXED AMOUNT |

SCORE CARD

HARD OPPORTUNITY COSTS
INDICATE COSTS TO BUSINESS OF INCIDENTS WITH VARIOUS IMPACTS

| TYPE | DURATION | | | SCOPE | COST (1000S) | PER UNIT | SELECT |
|---|---|---|---|---|---|---|---|
| OUTAGE ▼ | < ▼ | 0 | MINUTES ▼ | GLBL ▼ | $ 0 | MINUTES ▼ | ☐ |
| OUTAGE ▼ | < ▼ | 0 | MINUTES ▼ | GLBL ▼ | $ 0 | MINUTES ▼ | ☐ |

ADD   DELETE

SOFT OPPORTUNITY COST WEIGHTS
INDICATE ADDITIONAL SOFT COST MULTIPLIERS FOR INCIDENTS WITH VARIOUS IMPACTS

RELIABILITY: ○━━━━━━━   0 (OF 10)
CAPACITY: ○━━━━━━━   0 (OF 10)
PERFORMANCE: ○━━━━━━━   0 (OF 10)

FIG. 7

AUTOMATED SERVICE LEVEL MANAGEMENT SYSTEM

BACKGROUND

Service Level Agreements (SLAs) are used in companies in many fields including financials services, natural resources such as oil and gas, and others. Service Level Management (SLM) has developed for managing creation and maintenance of SLAs. SLM formalizes the service agreement process between business service customers and Information Technology (IT). SLAs originally applied to agreements relating to equipment. More recently, SLAs have evolved toward agreements relating to overriding business services.

Service providers such Information Technology (IT) providers benefit from agreements with customers regarding quality of service to avoid disputes, allocate resources, and manage costs. However, adoption of SLAs has been limited both in terms of the number of companies implementing service-based service level agreements and the percentage of services that companies govern by service level agreements.

Adoption of Service Level Management (SLM) and Service Level Agreements (SLAs) has been limited by the extensive resource allocation for creating SLAs for the large number, for example hundreds or thousands, of business services that may be covered by a single provider.

Using conventional manual techniques, implementation of agreements across an entire mix of business services can cost companies millions of dollars. Once a service is included in a service catalog, lower impact and higher impact business services are treated the same so that even very low impact business services use a disproportionate amount of resources due to lack of formal prioritization or accountability. Service Level Management was created to solve the resource allocation problem. However, implementation costs continue to limit adoption even though SLAs have the potential for managing operational demand of IT.

Conventionally, SLAs are created by using Service Level Management software that allows Information Technology (IT) to formally capture agreements between the customer and IT. The software manually records the service level criteria developed by service level manager working with a customer so that a substantial labor cost is incurred in creating SLAs. SLAs are created on a case by case basis so that realistic estimates of service quality and budgeting for individual service level agreements are difficult.

In conventional operation, a Service Level Manager (SLM) typically starts a SLA process by collecting service level delivery information for several months and then using the information for negotiation between the customer and an Information Technology (IT) supplier. The SLM can also review usage trending with capacity and availability to develop an equipment plan for a future agreement period. The information is used by the Service Level Manager to negotiate terms with a customer. Once an agreement is in place, the Service Level Manager can report back on the performance of IT for the agreement on a percentage-of-availability delivered during defined hours of operation.

Conventional SLM systems involve high personnel costs for SLA creation. Also, because SLAs are created individually and rarely, overall tradeoffs and costs for multiple business services are not collected. SLAs are commonly created without considering possible alternatives to aspects of business services delivery and resource costs of the various alternatives. SLAs are conventionally created without relating quality of service and cost due to lack of information relating various services. A further difficulty with conventional SLM is that IT organizations and business services typically do not have a common definition of the affect of actual service delivered.

SUMMARY

An embodiment of method for service level management comprises identifying connected enterprise application components and, under control of an automated system, relating historical performance for the connected enterprise application components and electronically creating a service level agreement based on the historical performance relation.

BRIEF DESCRIPTION OF THE DRAWINGS

Embodiments of the invention relating to both structure and method of operation may best be understood by referring to the following description and accompanying drawings:

FIGS. 2A through 2E are schematic flow charts depicting embodiments of service level management methods;

FIG. 7 is a screen shot sequence showing an embodiment of a value center implementation.

DETAILED DESCRIPTION

An Automated Service Level Agreement System (ASLAS) automates creation and maintenance of service level agreements (SLAs). Service Level Agreements (SLAs) are useful for managing an information technology (IT) portfolio and for establishing the portfolio quality-of-service (QOS) delivered to IT customers. An illustrative ASLAS automates discovery of performance baselines and creation, maintenance, and tracking of SLAs.

Automated Service Level Agreement System (ASLAS) automates creation and maintenance of service level agreements (SLAs) to effectively balance service level priority, quality of service delivered, IT cost, and other aspects of business service handling.

The ASLAS can implement a value center concept that enables optimization of service level management.

An illustrative Automated Service Level Agreement System (ASLAS) comprises multiple various enterprise application component parts that are combined into an integrated form. In an initial operation, the ASLAS can enable a user to establish a service catalog if the catalog does not yet exist. In some embodiments and conditions, an application mapping tool may be employed to discover connected enterprise application components including networks, servers, storage, and the like. Once the information is collected, business impact analysis can be performed for some or all business services and entered into the ASLAS to perform actions including service level balancing and staff loading or scheduling.

The ASLAS analysis and management actions can be based on the particular business service objects in the system and historically-derived performance. Historically-derived performance, in one example, may be tracked by relating the number of occurrences of service performance failure or degradation that results in down-time during a month to the total available time during the month. In conditions that a service dependency map exists, the map can be used with a record of a Configuration item (CI) to determine the affect of component performance on service delivery.

The ASLAS uses historical measures to model service level performance and to model an expected level of performance for a future period. A business service can be analyzed on the basis of percentage availability, a response time distribution, and a resolution time distribution during a measured time period. The business service analysis enables determination of overall business service performance including, for example, expected availability, expected incident rate, expected response, and expected resolution time. One deficiency of traditional business service analysis is an inability to model historical performance of an entire service portfolio and then determine the affects of changing decisions about service levels and staffing.

Figure 1:
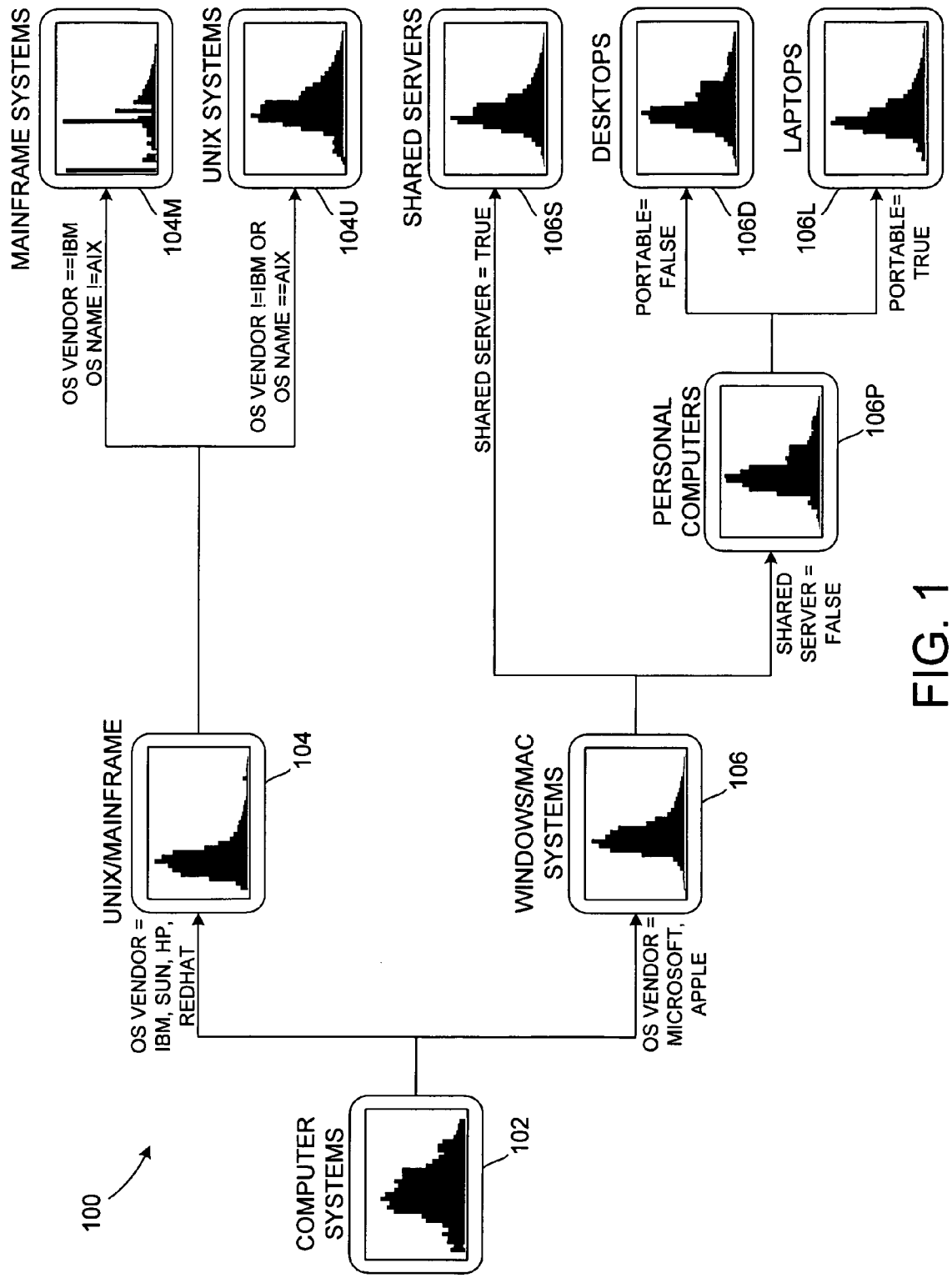
FIG. 1 is a schematic block diagram that illustrates an embodiment of infrastructure configured for behavioral modeling.

Referring to FIG. 1, a schematic block diagram illustrates an embodiment of infrastructure 100 configured for behavioral modeling. The infrastructure 100 enables asset classes of like behavior to be determined, thus enabling prediction of the business service performance. Enterprise application components depicted in the infrastructure 100 has computer systems 102 including UNIX/Mainframe systems 104U, 104M and Windows/Mac systems 106. The Windows/Mac systems 106 further can be classified as shared servers 106S and personal computers 106P that are further classified into desktops 106D and laptops 106L.

FIG. 1 illustrates operation of ASLAS to effectively develop behavioral models for each asset class used for a business service or a supported application. ASLAS aggregates performance across each asset class within a configuration management database (CMDB). Performance measurements include availability, incident rate, response times, incident resolve times, and possibly other criteria. With performance information, software can establish an expected level of performance in future operation by aggregating expected asset class performance for some or all components of a business service or delivered application.

In the illustrative system, component performance data can be derived by interrelating business service object components with historical performance level data stored in Service Level Management software or historical repositories. Once extracted, the component performance data can then be used to produce a virtual or derived Service Level Agreement (SLA). The ASLAS enables aggregate analysis of multiple enterprise level components that can be highly variable in characteristics, and further includes consideration of labor pool and labor pool mix, for forming the SLA.

Figure 2A:
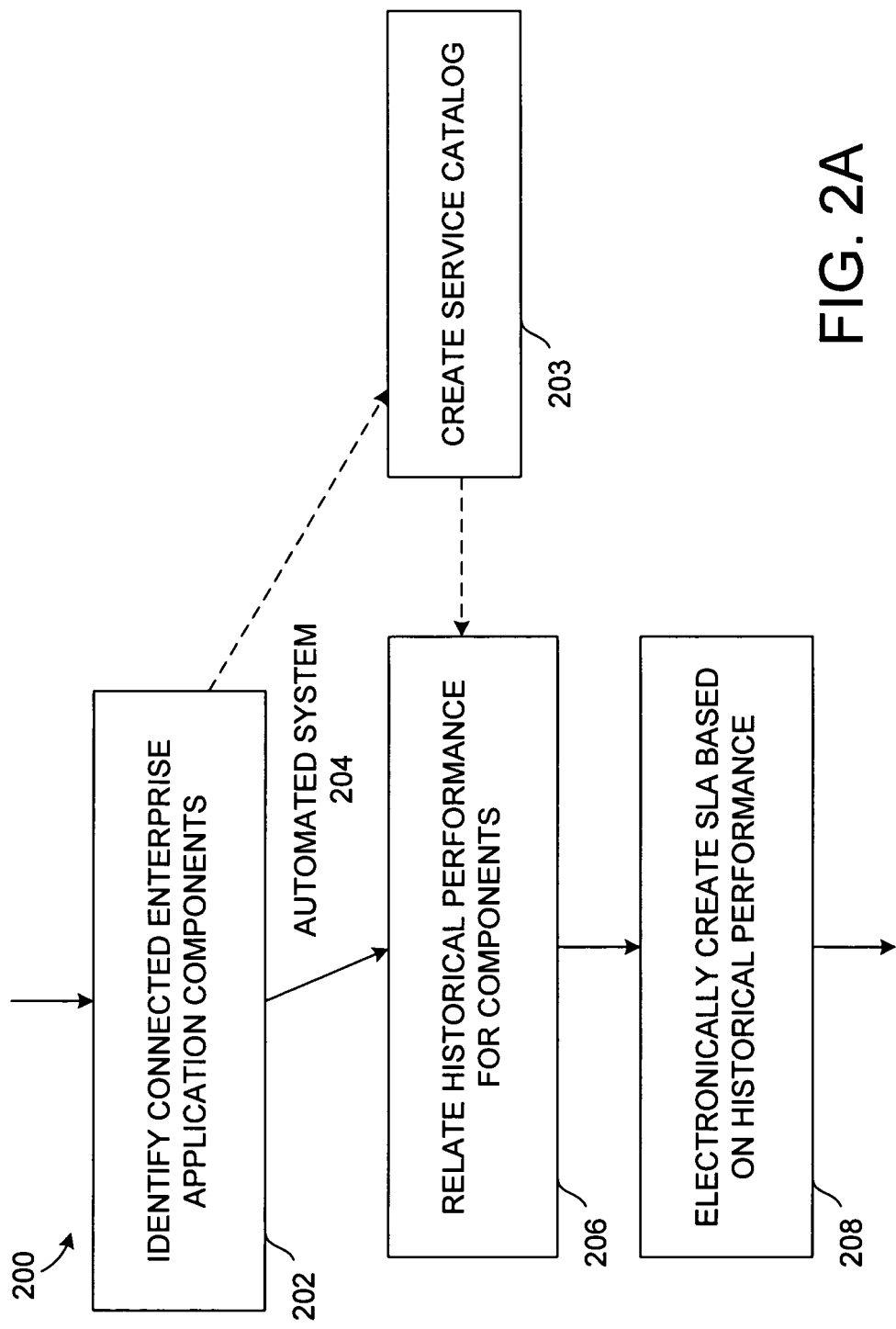

Referring to FIG. 2A, a schematic flow chart depicts an embodiment of a service level management method 200. The method 200 comprises identifying 202 connected enterprise application components and, under control of an automated system 204, relating 206 historical performance for the connected enterprise application components. The method further comprises electronically creating 208 a service level agreement based on the historical performance relation.

In some embodiments, the method 200 may further comprise creating 203 a service catalog designating enterprise application components. Based on the service catalog, an automated service level management system uses historical data to model define applications and automatically create a service level agreement, either virtual or defacto, for business services.

The ASLAS uses the historical information to perform business impact analysis and balance service levels, resources, service maintenance levels, resources, service maintenance schedules, cost, and service quality. In the process, the number of Service Level Managers to perform management services can be greatly reduced, shifting to a role focused on acquiring services, service level planning, and negotiation of terms. The ASLAS enables allocation of resources according to business impact-ladened demand so that the method 200 has potential to improve better service quality while reducing overall staffing.

In addition to using the historical record and business impact rules defined by organization departments devoted to business services, impact of business performance can be analyzed and understood in terms of a specific business unit, the business as a whole, or any subset of business units.

The service level management method 200 improves performance and efficiency of SLM in part by automating the process for creating service level agreements from creation to deployment. The process automates collection of historical data and information inputting to the system, as well as analysis and deployment of SLAs. In contrast, a conventional SLM system has service level managers develop a service level negotiating point for every business service.

Figure 2B:
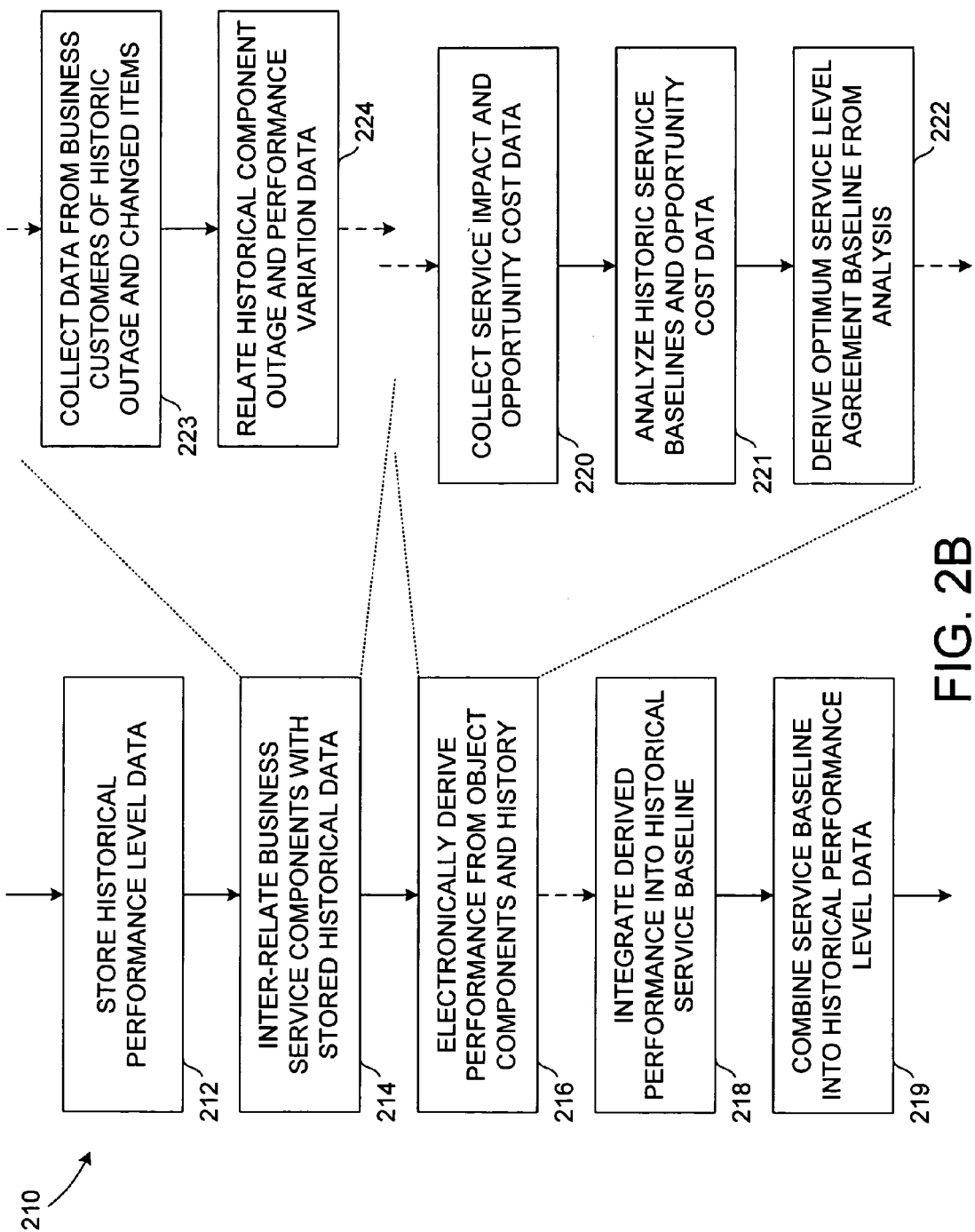

Referring to FIG. 2B, a service level management method 210 can further comprise storing 212 historical performance level data in a storage such as a computer memory, long-term storage devices such as disks or tapes, network storage, and the like. The method 210 can further include interrelating 214 business service object components with the stored historical performance level data. Business service component performance can be electronically derived 216 from the interrelated business service object components and the historical performance level data.

In some implementations, the derived business service component performance can be integrated 218 into a historically-based service baseline. The historically-based service baseline can be combined 219 into the historical performance level data.

In a particular embodiment, data from business customers regarding service impact and opportunity cost can be collected 220 for a changed component performance condition. The method 210 can further comprise analyzing 221 a series of historically-based service baselines and opportunity cost data. An optimum service level agreement baseline can be derived 222 from the analysis.

Some embodiments can implement actions including collecting 223 data from business customers regarding historical component outage and changed component performance condition. Historical component outage and system performance variation to component performance can be related 224.

Figure 2C:
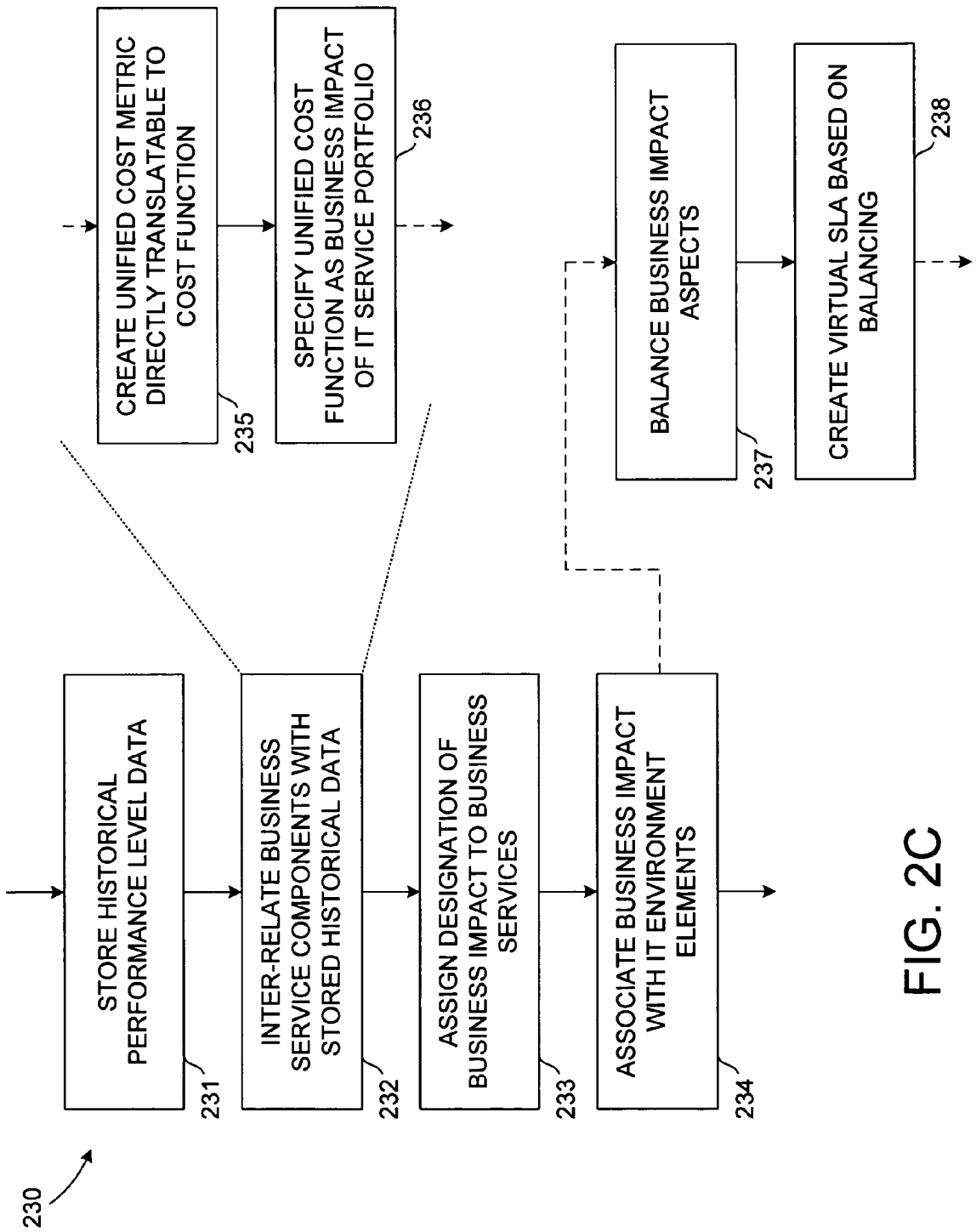

Referring to FIG. 2C, a service level management method 230 can further comprise storing 231 historical performance level data in a storage or memory and interrelating 232 business service object components with the stored historical performance level data. A designation of business impact can be assigned 233 to business services, associating 234 the business impact with a plurality of different elements of an information technology (IT) environment including business services, departments, operators, and work groups.

A unified metric for cost can be created 235 that is directly translatable to revenue from the assigned business impact. For example, a unified cost function can be specified 236 as a business impact that describes value of delivery of a portfolio of services by information technology to a business.

In some configurations, the method 230 can further comprise electronically balancing 237 business impact aspects including service level, resources, service maintenance schedules, cost, and quality of service. Virtual service level agreements can be created 238 based on the balance.

Referring to FIG. 2D, a service level management method 240 can further collect information for relating information technology (IT) organizations to business services. The method 240 can comprise collecting 241 information on information technology (IT) organizations that supply services to business services and collecting 242 information on the business services that receive services from the IT organizations. Relationships between the IT organizations and business services are established 243 and business impact rules at the IT organization level for downtime and/or degraded performance are established 244.

In some embodiments, the method 240 can further comprise analyzing 245 the established IT organization-business services relationships and the established business impact rules in combination with the historical performance. Historical performance impact is determined 246 based on the analysis.

Referring to FIG. 2E, a service level management method 250 can determine address work-around solutions to events or conditions. Impact of downtime and/or degraded performance can be identified 252 at a work-around level. An auditable impact trail can be created 254 based on the identified impact.

Figure 3:
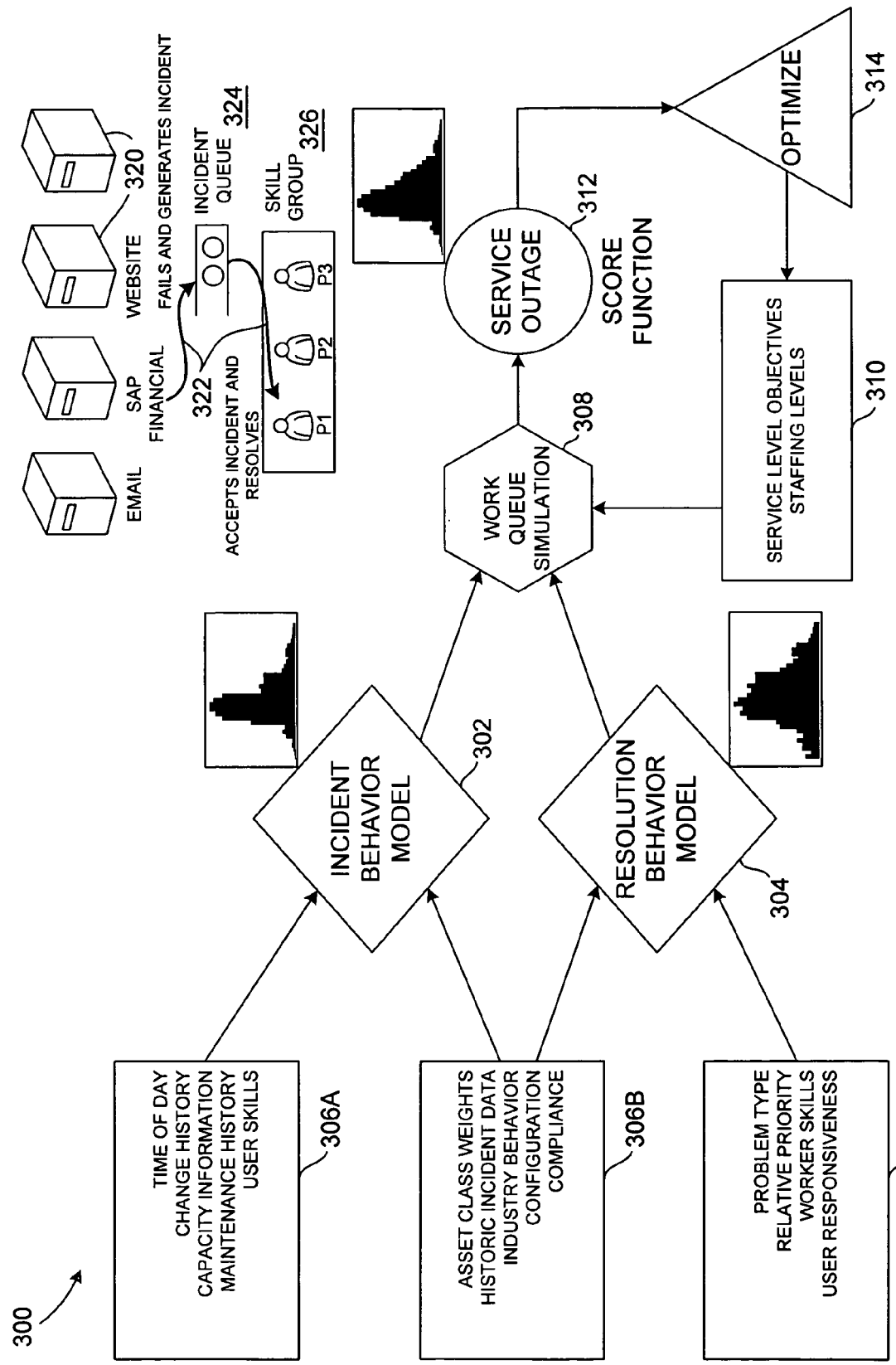
FIG. 3 is a schematic block diagram that depicts an embodiment of an infrastructure adapted for behavioral simulation.

Referring to FIG. 3, a schematic block diagram depicts an embodiment of an infrastructure 300 adapted for behavioral simulation. Infrastructure class models can be used to simulate future behavior. The infrastructure 300 includes an incident behavior model 302 and a resolution behavior model 304. A data storage 306A supplies information such as time of day, a change history, capacity information, a maintenance history, user skills, and the like to the incident behavior model 302. A data storage 306B supplies information including asset class weights, historic incident data, industry behavior, configuration compliance, and others to the incident behavior model 302 and the resolution behavior model 304. A data storage 306C supplies information including problem type, relative priority, worker skills, user responsiveness, and the like to the resolution behavior model 304. Information from the incident behavior model 302 and the resolution behavior model 304 is applied to a work queue simulation 308 along with feedback 310 including service level objectives and staffing levels. Results of the simulation are transmitted from the work queue simulation 308 to a store function 312 that stores service outage information. An optimization 314 can be run to determine service level objectives and staffing levels and applied as feedback 310.

The chart depicted in FIG. 3 shows how service is modeled in terms of various events and conditions such as incidents, costs, and risk. By aggregating the service models, global tradeoffs and decisions can be made across the business services portfolio, enabling resource and service decisions to be made across the service portfolio. Modeling enables agreements to be made concerning various aspects of business services including the labor pool and expected requirements. By embedding realistic agreements into service management software, performance can be driven to items of greatest business value.

In a next level of operation following modeling 302 and 304, a Service Level Manager collects input information from business customers regarding the costs/impact/opportunity cost for downtime or system performance change for a business service. The ASLAS takes into consideration the information from business customers in combination with accumulated historical service data. As a result of the analysis, the ASLAS can trade off historical system service quality against opportunity cost in an operational research model. The ASLAS can automatically derive Service Level Agreements (SLAs) across an Information Technology (IT) portfolio by calculating interrelating service opportunity cost to available IT investment.

The system optimizes the distribution of service level objectives by relating requirements and labor to downtime impacts for each business service. An insert pictorial diagram in FIG. 3 shows an embodiment of an optimization process. A plurality of business services 320 are shown in combination with lines 322 depicting the expected performance for a business service. Incidents information is queued in an incidence queue 324 and activates a skill group 326 to adjust performance for the service. The output determination of the optimization can be expressed as IT cost versus risk change. Service changes are shown as a response to a change in expected results or in business service knobs 324.

Figure 4A:
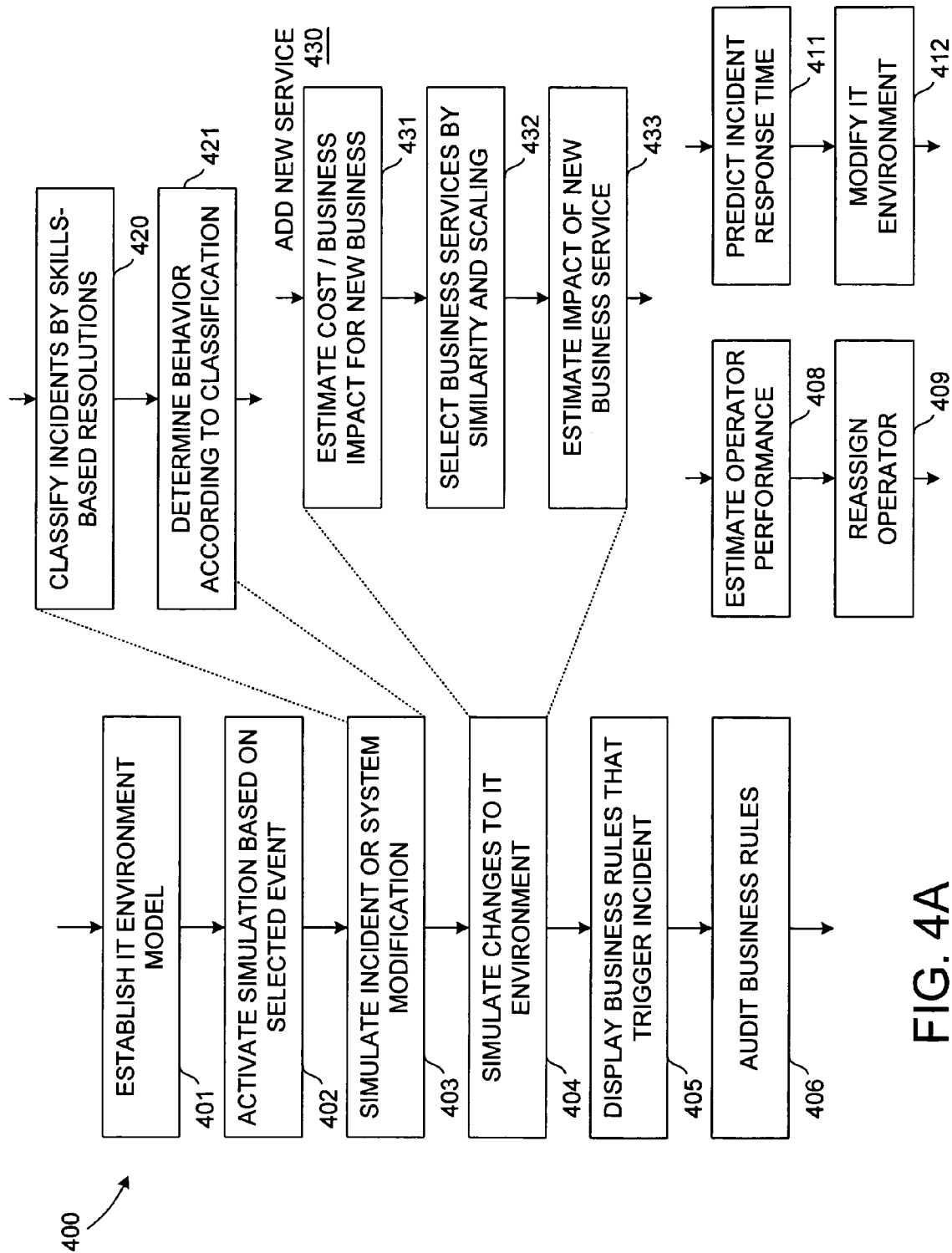
FIGS. 4A through 4C are schematic flow charts showing embodiments of a service level management method that perform a business infrastructure simulation.

Referring to FIG. 4A, a schematic flow chart depicts an embodiment of a service level management method 400 that performs a business infrastructure simulation. The service level management method 400 is performed according to acts comprising establishing 401 an information technology (IT) environment model whereby entities including departments, business services, configuration items, work groups, and/or operators respond to a system input signal that can be used to simulate collective IT behavior. A simulation is activated 402 based on an event selected from among a plurality of predetermined incidents and/or predetermined system modifications. The method further comprises simulating 403 performance to an incident and/or system modification affecting a business service according to the established business impact rules producing a response according to the established IT environmental model and simulating 404 changes to the IT environmental model to validate expected changes to performance to the changes in an actual IT environment. The method 400 can also enable updating of business rules implemented in the simulation by displaying 405 rules that trigger the simulated incident and auditing 406 the rules, if desired.

In various embodiments, different techniques can be used to update the simulation model. For example, a profile of a preselected operator can be established 408 that estimates the operator's capability to process events in terms of success, quality, and time in context of the established IT environment model. The operator can be reassigned 409 based on the profiled capabilities.

In other embodiments, the method 400 may comprise predicting 411 changes to intensity and type of incident to determine expected incident response time. The IT environment can be proactively modified 412 in response to the changes.

In various embodiments, events such as incidents and imposed business services modifications can be handled in different manners. In some embodiments, incidents can be classified 420 according to skills-based resolutions behavior. The method 400 can further comprise determining 421 behavior according to the classification for expected paths-to-resolution and expected processing time.

In some embodiments, a requested business services modification can be the addition 430 of a new business service. The method 400 can further comprise estimating 431 cost and business impact for adding a new business service to the established IT environment and selecting 432 business services according to similarity and scaling of the selected business services, enabling estimation 433 of the impact of adding the new business service.

Figure 4B:
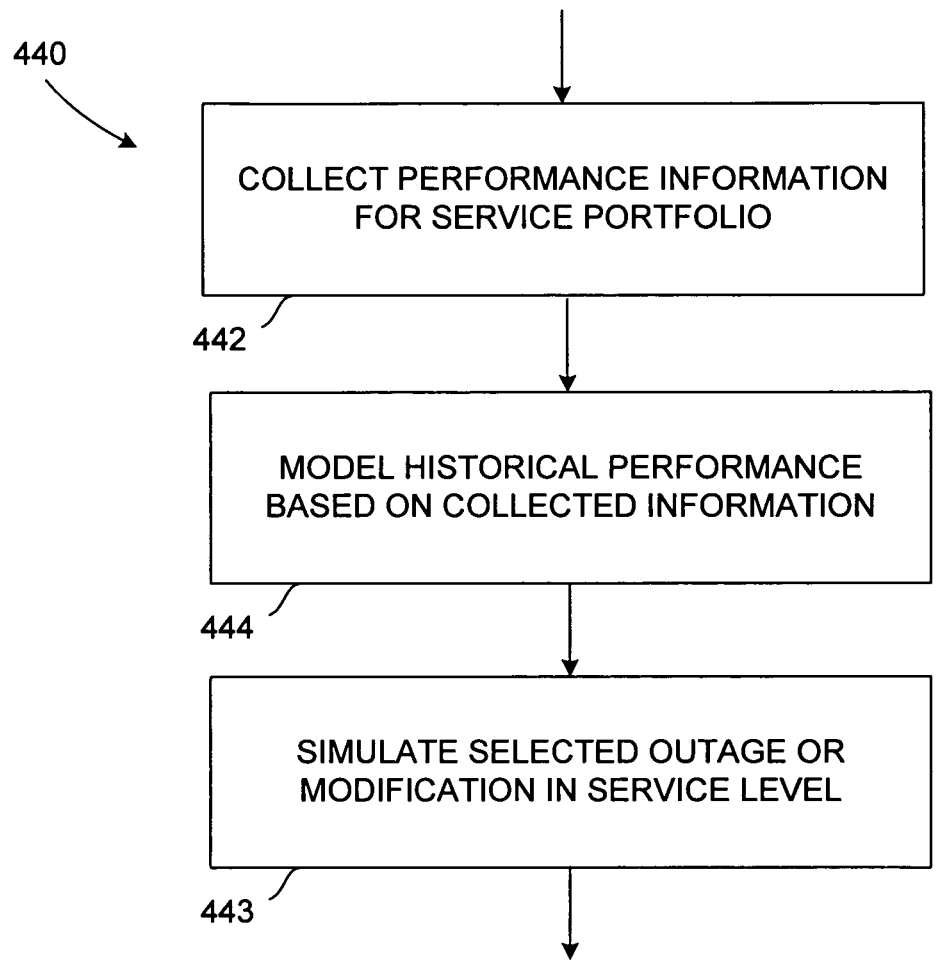

Referring to FIG. 4B, a schematic flow chart depicts another embodiment of a service level management method 440 that includes business infrastructure simulation. The method 440 comprises collecting 441 performance information for a service portfolio and modeling 442 historical performance of the service portfolio based on the collected information. A selected outage incident and/or a selected modification in service level decisions can be simulated 443 to determine performance impact across business services.

Figure 4C:
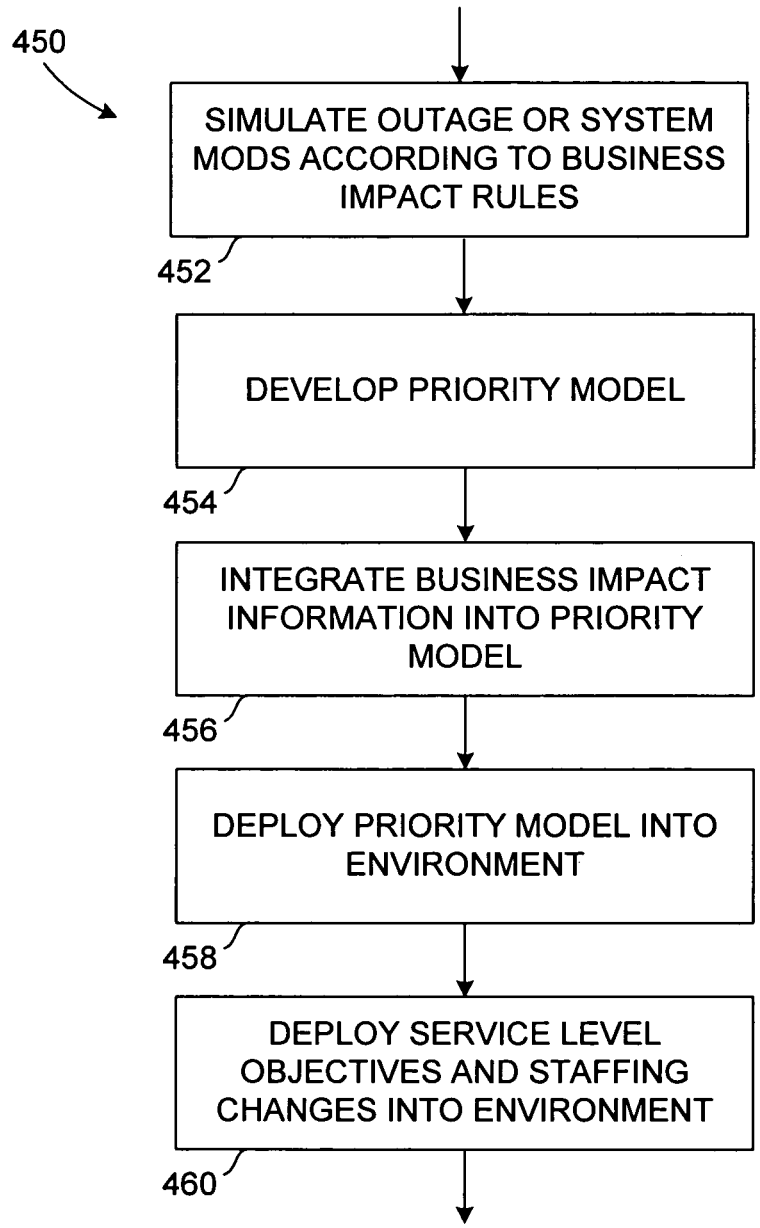

Referring to FIG. 4C, a schematic flow chart depicts another embodiment of a service level management method 450 that implements other simulation aspects. The method 450 comprises simulating 452 performance to incidents and/or system modifications affecting a business service according to established business impact rules. A priority model is developed 454 that specifies relative priority of an incident relative to other processed incidents according to the simulation and service level objectives and business impact information is integrated 456 into the priority model. The priority model is deployed 458 into a service management environment and service level objectives and staffing changes are deployed 460 into the service management environment.

Figure 4D:
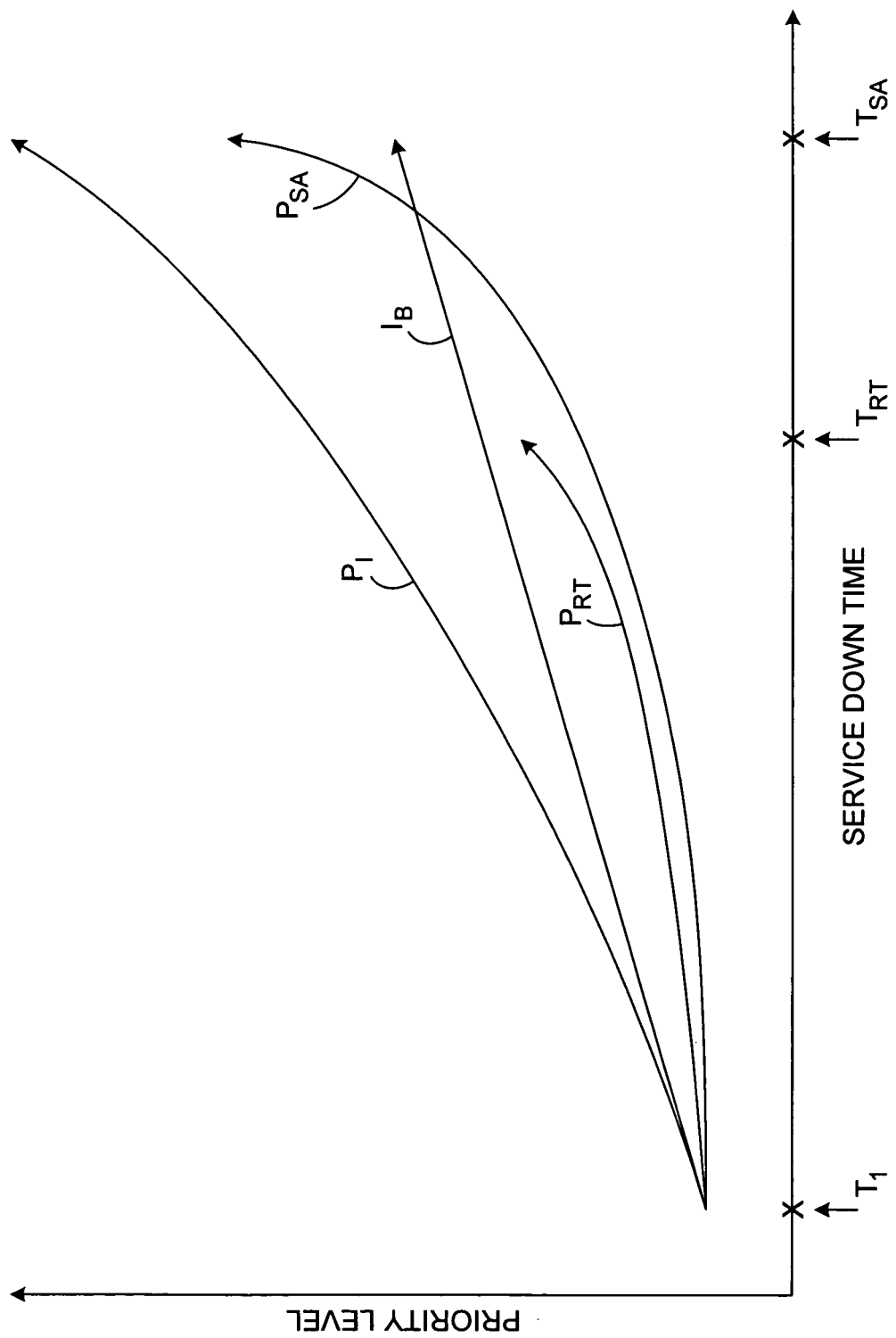
FIG. 4D is a graph that describes a general method for integration into a priority model.

Referring to FIG. 4D, a graph describes a general method for integration into a priority model. Priority level is plotted against time, specifically service downtime. An incident ticket is opened at time $T_1$. Noted points on the time line include time to service level organization (SLO) response time breach $T_{RT}$ and time to service level organization (SLO) service availability breach $T_{SA}$. The graph show priority attributable to response time $P_{RT}$ and priority attributable to service availability $P_{SA}$, as well as integrated priority $P_I$ which combines priority attributable to response time $P_{RT}$ and priority attributable to service availability $P_{SA}$. The graph also shows direct business impact $I_B$.

Figure 5:
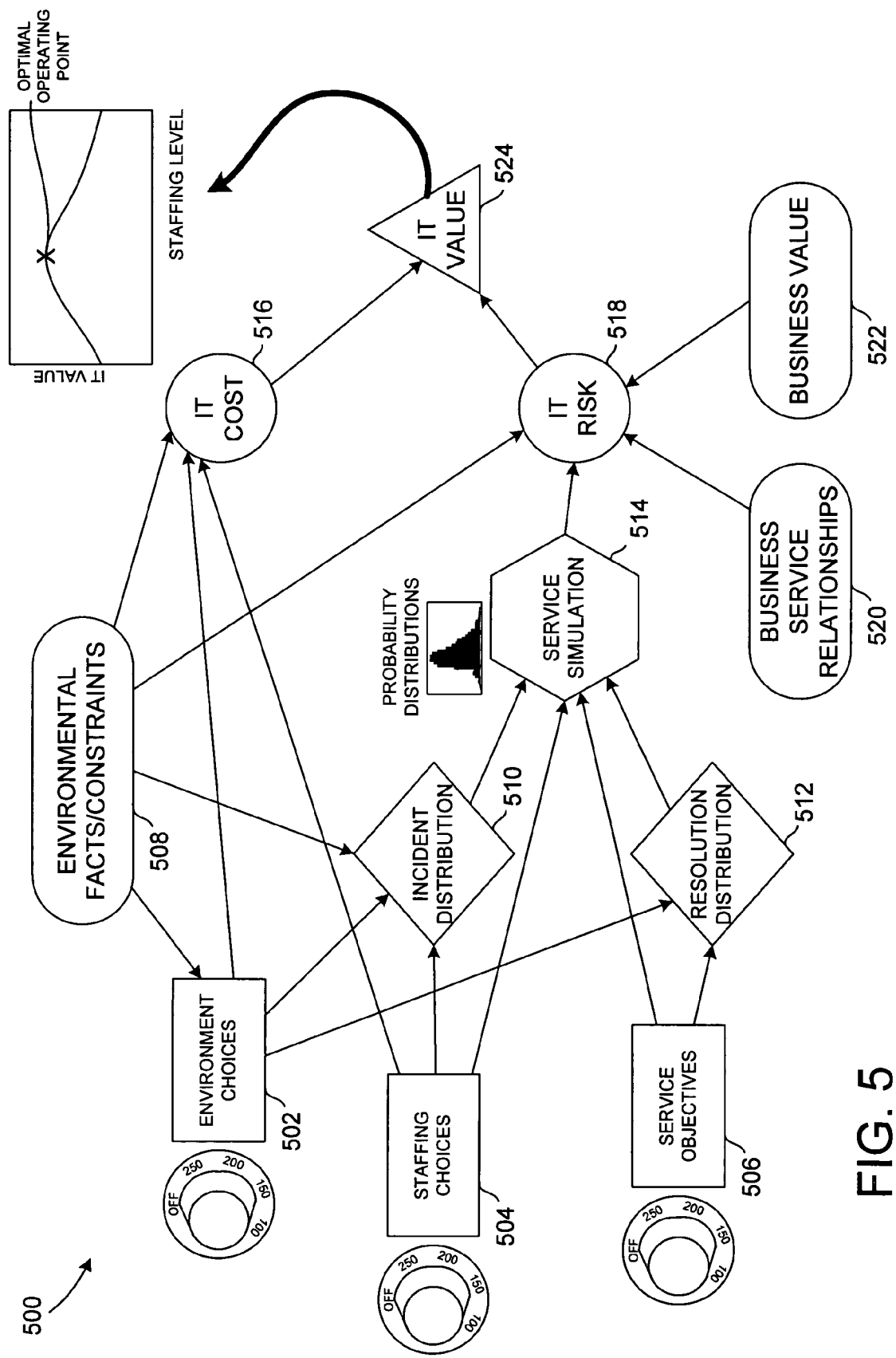
FIG. 5 is a schematic block diagram illustrating an embodiment of a business services model that operates in the manner of a "Sim-City" type simulation for an information technology (IT) application.

Referring to FIG. 5, a schematic block diagram illustrates an embodiment of a business services model 500 that operates in the manner of a "Sim-City" type simulation for an information technology (IT) application. Input parameters to the simulation can be grouped as environmental choices 502, staffing choices 504, and service objectives 506, although other parameter groups may be implemented in other applications. Other constraints applied to the simulation include environmental facts and/or constraints 508. The input parameters and environmental facts and/or constraints 508 are applied to make up distributions including an incident distribution 510 and a resolution distribution 512. The service simulation 514 executes based on the incident distribution 510 and the resolution distribution 512, and from staffing choices 504 and the service objectives 506. IT cost 516 is determined by a calculation that derives costs from environment facts and/or constraints 508, environmental choices 502, and staffing choices 504. IT risk 518 is determined by a calculation based on simulation results, business service relationships 520, and business value 522. IT value 524 is determined by a simulation as a function of IT cost 516 and IT risk 518.

The business services model 500 that is operational as part of ASLAS, rather than having human intervention to manually calculate a service level baseline, uses application mapping with historical level performance, for example as configured in the environmental facts and/or constraints 508, to calculate the service level baseline. With baselines established, the ASLAS uses opportunity cost to recommend objective-based service level agreements (SLAs), creating virtual SLAs.

Figure 6A:
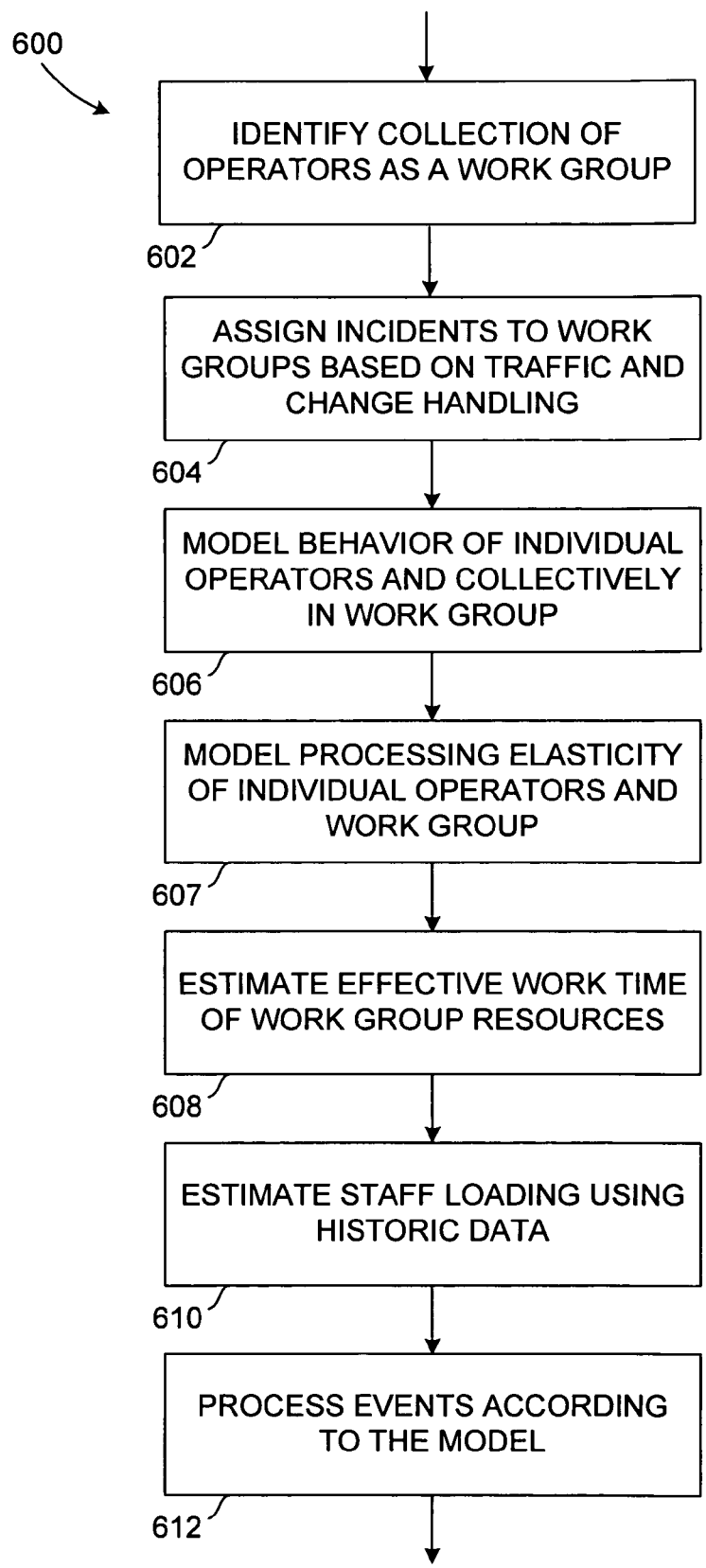
FIGS. 6A, 6B, and 6C are schematic flow charts depicting embodiments of a service level management method that handle business services based on several considerations.

Referring to FIG. 6A, a schematic flow chart depicts an embodiment of a service level management method 600 that organizes operators into work groups. The method 600 comprises identifying 602 a collection of operators as a work group, assigning 604 incidents to work groups based on work group traffic and work group efficacy for dynamically accommodating changes in loading, and modeling 606 behavior of individual operators in the work group and behavior of the collective work group. Modeling 606 of the behavior can further comprise modeling 607 of processing elasticity of the individual operators and/or work group with increasing demand of event processing. The method 600 can further comprise estimating 608 effective work time of resources for a work group whereby staff loading can be expressed as a full-time equivalent and estimating 610 the staff loading using historic data. Events assigned to the work group are processed 612 according to the modeling.

Figure 6B:
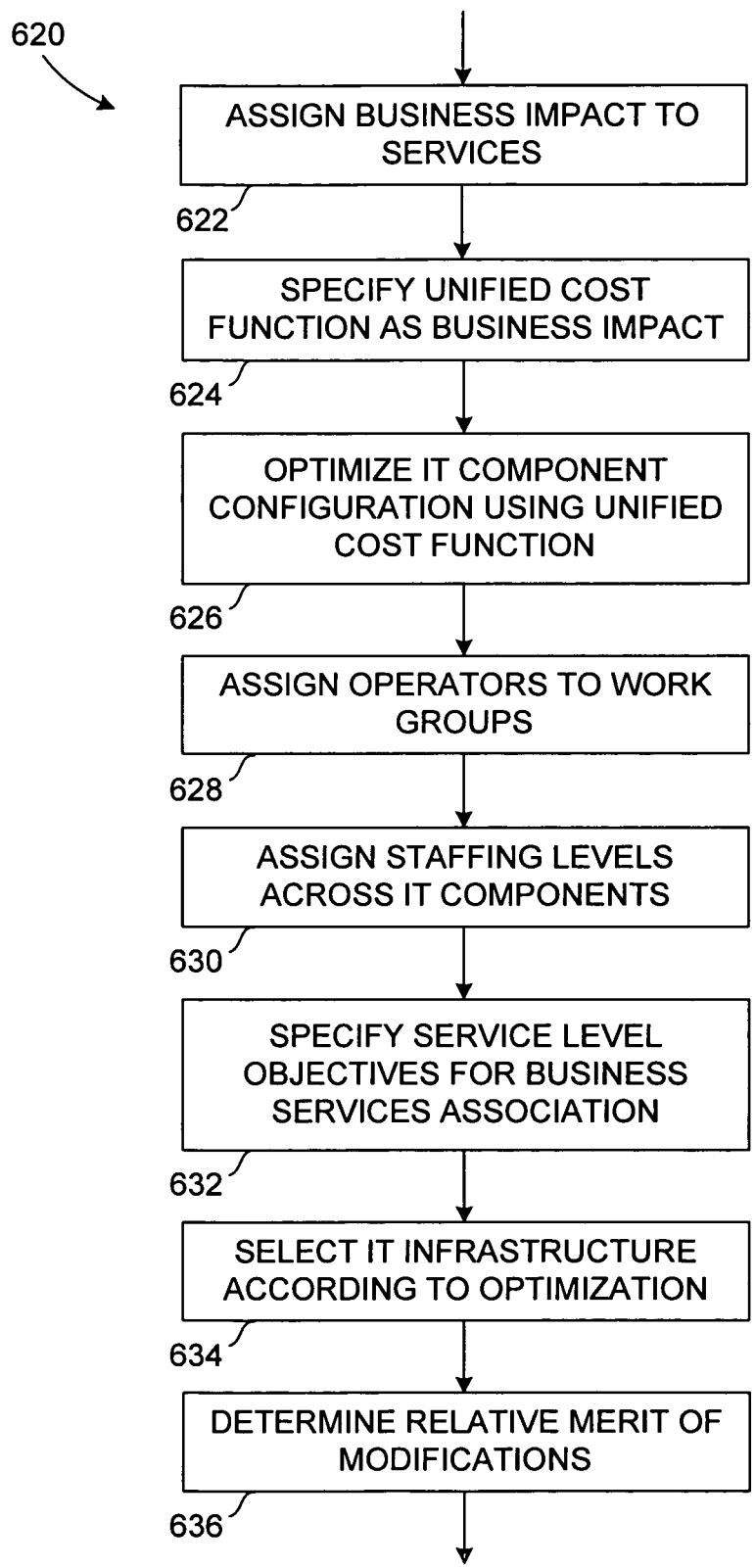

Referring to FIG. 6B, a schematic flow chart depicts an embodiment of a service level management method 620 that managers services according to business impact. The method 620 comprises assigning 622 business impact to services and specifying 624 a unified cost function as a business impact that describes value of delivery of a portfolio of services by information technology to a business. Configuration of information technology (IT) components can be optimized 626 using the unified cost function whereby business impact within defined constraints is minimized. Assignment 628 of operators to work groups and staffing level 630 across the IT components can be determined according to the optimization. The method 620 further comprises specifying 632 service level objectives for association with business services and selecting 634 IT infrastructure according to the optimization, and determining 636 relative merit of modification to staffing, service level objectives, and/or infrastructure.

In an embodiment, optimization may be initialized by equation. For illustrative purposes, optimization for staffing problem statements is shown although a similar optimization can be used for various aspects of a system. For an arbitrary time interval, let $L=\{I_{S_1}, \ldots, I_{S_M}\}$ be loading levels for a set of M assignment groups $S=\{S_1, \ldots, S_M\}$ and let $A=\{a_{b_1}, \ldots, a_{b_N}\}$ be the availability associated with N business services $B=\{b_1, \ldots, b_N\}$. The availability $a_{b_i}(L)$ of a business service is a function of assignment group loading. The business impact for a business service is a function of availability $I_{b_i}(a_{b_i}(L))$. To minimize business impact, business service impact and staffing are taken into consideration according to equation (1):

$$\min\left[\sum_i I_{b_i}(a_{b_i}(L)) + \sum_j \chi^l s_j\right] \quad (1)$$

where $\chi$ is the burdened cost of a full-time equivalent employee (FTE), subject to constraints $a_{b_i}(L) > \alpha_{b_i}$, $1_{s_1} > \lambda_{S_1}$, and $$\Lambda_{\min} < \sum_j l_{S_j} < \Lambda_{\max}.$$

Figure 6C:
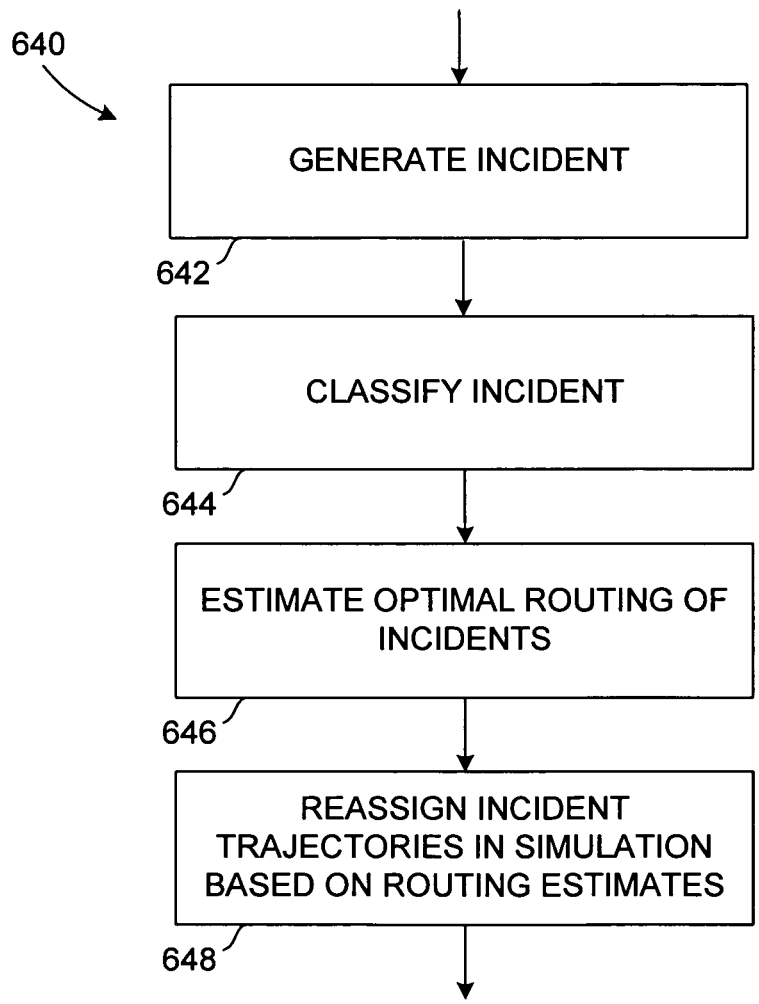

Referring to FIG. 6C, a schematic flow chart depicts an embodiment of a service level management method 640 that handles services according to incident analysis. The method 640 comprises generating 642 an incident for a business service based on expected failure, expected performance deterioration, actual failure, or actual performance deterioration, and classifying 644 incidents. Optimal routing of incidents to assignment groups is estimated 646 according to the incident classification and incident trajectories in simulation are reassigned 648 based on best routing estimates to determine business impact of optimal incident assignment.

Referring to FIG. 7, a screen shot sequence depicts an embodiment of a value center 700 implementation. Some embodiments may be configured for improved quantification of the impact of downtime and performance degradation. A problem with conventional analysis, which typically is manual, is that the impact of downtime in continuity analysis is often estimated, for example at the business service level of abstraction, and may be highly inaccurate.

Value centers 700 enable capture of the impact of downtime or degraded performance at the level of the work around. For example, an Enterprise Resource Planning (ERP) system that ceases operation or becomes disabled will have a different impact on order entry, accounts payable, or financial statement creation than an operational system. The value center concept enables creation of a relationship between departments so that each department can create auditable impact rules for downtime or impact at specific time frames or for a selected time duration.

The value center 700 can be used to create a much more precise and auditable impact trail and can be used to perform several additional functions. First, the value center 700 can be used to aggregate impact affects in simulation from the business service to associated component customer users.

Second, by running historical performance across value center impact rules, the value center 700 enables abstraction of service level availability into the dollars and cents impact of service delivery, and then enables analysis of the abstracted information for areas where staffing or hardware architecture can limit business performance. For example, a business service may be scheduled to cease operation, such as for maintenance, at a specified time and for a specified duration, but otherwise is fully operational. Value center analysis can determine that, if impact is high a high performing service can limit business performance.

Third, a value center can aggregate the impact of value centers into business services and then test a simulated data center outage, enabling an outage to be related to a business unit and associated services. The value center further enables creation of continuity plans that are realistic and well-designed.

Figure 8:
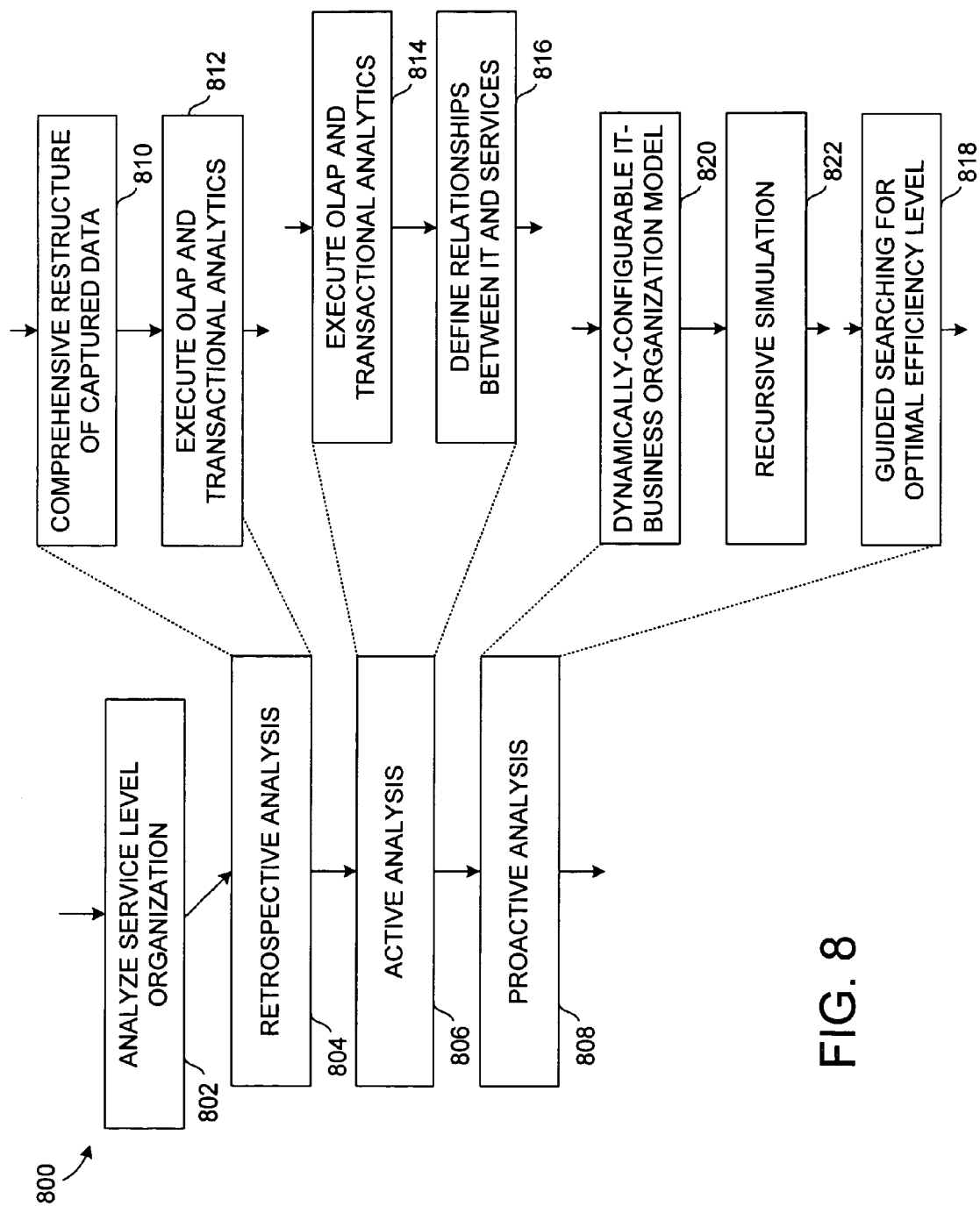
FIG. 8 is a schematic flow chart illustrating an embodiment of a service level management method that can be used as a decision center for an automated service level agreement system (ASLAS).

Referring to FIG. 8, a schematic flow chart illustrates an embodiment of a service level management method 800 that can be used as a decision center for an automated service level agreement system (ASLAS). The service level management method comprising analyzes 802 a service level organization. The analysis 802 further comprises executing a retrospective analysis 804, an active analysis 806, and a proactive analysis 808. The retrospective analysis 804 is an analysis of historic performance that deconstructs the historic performance according to historic actual functioning of information technology (IT) business services staff and service level organization deployment. The active analysis 806 inspects IT business services current performance. The proactive analysis 808 can be a simulation of IT business services performance including proactive entry of events and/or change conditions for staff and service level organization deployment simulation.

In an illustrative embodiment, retrospective analysis execution 804 can further comprise executing 810 a comprehensive restructuring of captured data for analysis of historic performance and executing 812 at least one On-Line Analytical Processing (OLAP) and transactional analytics for historic performance characterization.

In some embodiments, the active analysis execution 806 can further comprise executing 814 at least one On-Line Analytical Processing (OLAP) and transactional analytics for current performance characterization, and defining 816 relationships between information technology (IT) business services and customers in an IT-centric perspective that enables determination of impact of unavailable and/or non-performed business services.

In some embodiments, executing 808 the proactive analysis can further comprise guided searching 818 to determine optimal efficiency level. The guided search 818 takes into consideration one or more primary areas for search, for example business services, value centers, and assignment groups. The guided search 818 can also consider different approaches for sorting including business impact, differences in business impact between two scenarios such as a baseline scenario and a scenario with staff cut by a selected percentage across assignment groups, differences in business impact between two scenarios given a change or modification, and the like.

In an illustrative embodiment, the proactive analysis execution 808 can further comprise executing 820 a dynamically-configurable information technology (IT) and business organization model that selectively simulates historic, current, and/or prospective performance, enabling experimentation to determine potential performance before invoking organizational changes. Proactive analysis 808 can further comprise executing 822 a guided search and optimization for recursive simulation, enabling optimal configuration by iterative simulation changes, determination of change vectors, and deploying simulation results into a new simulation model.

Traditionally, service level agreements (SLAs) are created through actions of service personnel to manually define SLA parameters. In contrast, the illustrative ASLAS automates SLA creation. The ASLAS typically uses software to calculate historic service levels and application mapping to determine which systems support uptime and service performance, enabling elimination of much of the labor cost for SLA definition and creation. Additionally, the ASLAS can automatically calculate end-to-end uptime for a business services system through consideration of all components that affect uptime. The ASLAS can also calculate baseline SLAs by trading off delivered performance, relatively business service importance, and recommended SLA baselines, using techniques that do not require human intervention or labor other than manual operations defined the service level maps and calculation of downtime impact.

Due to high labor intensive characteristics, a traditional manual Service Level Management (SLM) implementation that operates across an extended enterprise can easily cost millions of dollars. Despite the high cost of traditional Service Level Management, operating without a Service Level Agreement (SLA) is risky since costs of business services failure or downtime can far exceed costs of SLM. Furthermore, without a SLA to define the business understanding between a business and an information technology (IT) provider, dispute and/or litigation costs can also be very high. Furthermore, disputes that result from lack of a SLA can divert personnel from proper business functions to handling and management of the dispute, creating inefficiency and disabling the IT provider from proper business functions. The ASLAS interrelates service performance, opportunity cost, and available budget to enable an IT supplier to better operate in a business-like manner and better realize operating factors such as cost and priority.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A service level management method comprising:
identifying connected enterprise application components;
under control of an automated system:
relating historical performance for the connected enterprise application components; and
electronically creating a service level agreement based on the historical performance relation obtained from analysis of the connected enterprise application components that are identified, wherein the relating and the electronically creating are performed by one or more computers.

2. The method according to claim 1 further comprising:
creating a service catalog designating enterprise application components.

3. The method according to claim 1 further comprising:
storing historical performance level data in a storage;
interrelating business service object components with the stored historical performance level data; and
electronically deriving business service component performance from the interrelated business service object components and the historical performance level data.

4. The method according to claim 3 further comprising:
integrating the derived business service component performance into a historically-based service baseline; and
combining the historically-based service baseline into the historical performance level data.

5. The method according to claim 4 further comprising:
collecting data from business customers regarding service impact and opportunity cost for a changed component performance condition;
analyzing a series of historically-based service baselines and opportunity cost data; and
deriving an optimum service level agreement baseline from the analysis.

6. The method according to claim 4 further comprising:
collecting data from business customers regarding historical component outage and changed component performance condition; and
relating historical component outage and system performance variation to component performance.

7. The method according to claim 1 further comprising:
storing historical performance level data in a storage;
interrelating business service object components with the stored historical performance level data;
assigning business impact to services;
associating the business impact with a plurality of different elements of an information technology (IT) environment including business services, departments, operators, and work groups;
creating a unified metric for cost that is directly translatable to revenue from the assigned business impact;
specifying a unified cost function as a business impact that describes value of delivery of a portfolio of services by information technology to a business;
electronically balancing business impact aspects including service level, resources, service maintenance schedules, cost, and quality of service; and
creating virtual service level agreements based on the balancing.

8. The method according to claim 1 further comprising:
collecting information on information technology (IT) organizations that supply services to business services;
collecting information on the business services that receive services from the IT organizations;
establishing relationships between the IT organizations and business services; and
establishing business impact rules at the IT organization level for downtime and/or degraded performance.

9. The method according to claim 8 further comprising:
analyzing the established IT organization-business services relationships and the established business impact rules in combination with the historical performance; and
determining a historical performance impact based on the analysis.

10. The method according to claim 8 further comprising:
establishing an information technology (IT) environment model whereby entities including departments, business services, configuration items, work groups, and/or operators respond to a system input signal that can be used to simulate collective IT behavior;
activating a simulation based on an event selected from among a plurality of predetermined incidents and/or predetermined system modifications;
simulating performance to an incident and/or system modification affecting a business service according to the established business impact rules producing a response according to the established IT environmental model;
simulating changes to the IT environmental model to validate expected changes to performance to the changes in an actual IT environment;
displaying rules that trigger the simulated incident; and
auditing the rules.

11. The method according to claim 10 further comprising:
establishing a profile of a preselected operator that estimates the operator's capability to process events in terms of success, quality, and time in context of the established IT environment model; and
reassigning the operator based on the profiled capabilities.

12. The method according to claim 10 further comprising:
predicting changes to intensity and type of incident to determine expected incident response time and proactively modify the IT environment in response to the changes.

13. The method according to claim 10 further comprising:
classifying incidents according to skills-based resolutions behavior; and
determining behavior according to the classification for expected paths-to-resolution and expected processing time.

14. The method according to claim 10 further comprising;
estimating cost and business impact for adding a new business service to the established IT environment; and
selecting business services according to similarity and scaling the selected business services to estimate impact of adding the new business service.

15. The method according to claim 1 further comprising:
collecting performance information for a service portfolio;
modeling historical performance of the service portfolio based on the collected information; and
simulating a selected outage incident and/or a selected modification in service level decisions for performance impact across business services.

16. The method according to claim 1 further comprising:
identifying a collection of operators as a work group;
assigning incidents to work groups based on work group traffic and work group efficacy for dynamically accommodating changes in loading;
modeling behavior of individual operators in the work group and behavior of the collective work group, the modeled behavior further comprising modeling of processing elasticity of the individual operators and/or work group with increasing demand of event processing;
estimating effective work time of resources for a work group whereby staff loading can be expressed as a full-time equivalent;
estimating the staff loading using historic data; and
processing events assigned to the work group according to the modeling.

17. The method according to claim 1 further comprising:
identifying impact of downtime and/or degraded performance at a work around level; and
creating an audible impact trail based on the identified impact.

18. The method according to claim 1 further comprising:
assigning business impact to services;
specifying a unified cost function as a business impact that describes value of delivery of a portfolio of services by information technology to a business;
optimizing configuration of information technology (IT) components using the unified cost function whereby business impact within defined constraints is minimized;
determining assignment of operators to work groups according to the optimization;
determining staffing level across the IT components according to the optimization;
specifying service level objectives for association with business services according to the optimization;
selecting IT infrastructure according to the optimization; and
determining relative merit of modification to staffing, service level objectives, and/or infrastructure.

19. The method according to claim 1 further comprising:
simulating performance to incidents and/or system modifications affecting a business service according to established business impact rules;
developing a priority model that specifies relative priority of an incident relative to other processed incidents according to the simulation;
integrating service level objectives and business impact information into the priority model;
deploying the priority model into a service management environment; and
deploying service level objectives and staffing changes into the service management environment.

20. The method according to claim 1 further comprising:
generating an incident for a business service based on expected failure, expected performance deterioration, actual failure, or actual performance deterioration;
classifying incidents;
estimating optimal routing of incidents to assignment groups according to the incident classification; and
reassigning incident trajectories in simulation based on best routing estimates to determine business impact of optimal incident assignment.

21. A service level management method comprising:
analyzing a service level organization comprising:
    executing a retrospective analysis of historic performance that deconstructs the historic performance according to historic actual functioning of information technology (IT) business services staff and service level organization deployment;
    executing an active analysis of IT business service current performance; and
    executing a proactive analysis of simulation IT business services performance including proactive entry of events and/or change conditions for staff and service level organization deployment simulation, wherein the analyzing of the service level organization, the executing of the retrospective analysis, the executing of the active analysis, and the executing of the proactive analysis are performed by one or more computers.

22. The method according to claim 21 comprising:
executing the retrospective analysis further comprising:
    executing a comprehensive restructuring of captured data for analysis of historic performance; and executing at least one On-Line Analytical Processing (OLAP) and transactional analytics for historic performance characterization.

23. The method according to claim 21 comprising:
executing the active analysis further comprising:
   executing at least one On-Line Analytical Processing (OLAP) and transactional analytics for current performance characterization;
   defining relationships between information technology (IT) business services and customers in an IT-centric perspective that enables determination of impact of unavailable and/or non-performed business services.

24. The method according to claim 21 comprising:
executing the proactive analysis further comprising guided searching to determine optimal efficiency level.

25. The method according to claim 21 comprising:
executing the proactive analysis further comprising:
   executing a dynamically-configurable information technology (IT) and business organization model that selectively simulates historic, current, and/or prospective performance, enabling experimentation to determine potential performance before invoking organizational changes; and
   executing a guided search and optimization for recursive simulation, enabling optimal configuration by iterative simulation changes, determination of change vectors, and deploying simulation results into a new simulation model.

* * * * *